(12) United States Patent
Yang (10) Patent No.: US 10,334,003 B2
(45) Date of Patent: Jun. 25, 2019

(54) MOBILE TERMINAL AND METHOD FOR ACHIEVING CLOUD STREAMING MEDIUM FILE SHARING BASED ON DLNA

(71) Applicant: HUIZHOU TCL MOBILE COMMUNICATION CO., LTD., Huizhou, Guangdong (CN)

(72) Inventor: Rui Yang, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 312 days.

(21) Appl. No.: 14/442,542

(22) PCT Filed: May 29, 2014

(86) PCT No.: PCT/CN2014/078803
§ 371 (c)(1),
(2) Date: May 13, 2015

(87) PCT Pub. No.: WO2015/123934
PCT Pub. Date: Aug. 27, 2015

(65) Prior Publication Data
US 2016/0294895 A1    Oct. 6, 2016

(30) Foreign Application Priority Data
Feb. 19, 2014 (CN) .......................... 2014 1 0056785

(51) Int. Cl.
*H04L 29/08* (2006.01)
*H04L 29/06* (2006.01)
(Continued)

(52) U.S. Cl.
CPC .......... *H04L 65/4069* (2013.01); *H04L 12/28* (2013.01); *H04L 67/10* (2013.01);
(Continued)

(58) Field of Classification Search
CPC ................................ H04L 29/06; H04L 29/08
See application file for complete search history.

(56) References Cited

U.S. PATENT DOCUMENTS

| | | | |
|---|---|---|---|
| 7,089,579 B1 * | 8/2006 | Mao | H04N 7/17318 348/E7.071 |
| 2002/0171763 A1 * | 11/2002 | Stecyk | H04L 12/2805 348/552 |

(Continued)

FOREIGN PATENT DOCUMENTS

| | | |
|---|---|---|
| CN | 102739779 A | 1/2012 |
| CN | 102739779 A | 10/2012 |

(Continued)

OTHER PUBLICATIONS

English Abstract of CN 103825890 A.
English Abstract of CN 103561279 A.

*Primary Examiner* — Chris Parry
*Assistant Examiner* — Stephen J Houlihan
(74) *Attorney, Agent, or Firm* — Andrew C. Cheng (57) ABSTRACT

A mobile terminal and a method for achieving cloud streaming medium file sharing based on DLNA are disclosed. The method includes when a DLNA sharing request is received from a user by a mobile terminal in the process of playing a cloud streaming medium file, acquiring from the cloud and caching a content clip of the streaming medium file by the mobile terminal according to the DLNA sharing request; searching for DLNA apparatuses in an LAN where the mobile terminal is located according to a DLNA protocol; and transmitting the cached content clip of the streaming medium file to one of the DLNA apparatuses that is chosen by the user from the searching result, and controlling the DLNA apparatus to play the content clip of the streaming (Continued)

medium file. The present disclosure allows to share the cloud streaming medium file with the DLNA apparatus via the mobile terminal.

15 Claims, 4 Drawing Sheets

(51) Int. Cl.
| | |
|---|---|
| *H04L 12/28* | (2006.01) |
| *H04N 21/00* | (2011.01) |
| *H04W 8/00* | (2009.01) |
| *H04N 21/2743* | (2011.01) |
| *H04N 21/41* | (2011.01) |
| *H04N 21/63* | (2011.01) |
| *H04N 21/845* | (2011.01) |
| *H04W 88/02* | (2009.01) |
| *H04W 4/00* | (2018.01) |

(52) U.S. Cl.
CPC ......... *H04L 67/2842* (2013.01); *H04N 21/00* (2013.01); *H04N 21/2743* (2013.01); *H04N 21/4126* (2013.01); *H04N 21/632* (2013.01); *H04N 21/8456* (2013.01); *H04W 8/005* (2013.01); *H04W 88/02* (2013.01); *H04L 67/16* (2013.01); *H04W 4/00* (2013.01)

(56) References Cited

U.S. PATENT DOCUMENTS

| | | | |
|---|---|---|---|
| 2006/0265384 A1* | 11/2006 | Lee | G06F 17/30017 |
| 2007/0033619 A1* | 2/2007 | Han | H04N 7/17318 |
| | | | 725/62 |
| 2008/0168523 A1* | 7/2008 | Ansari | G06Q 30/04 |
| | | | 725/131 |
| 2008/0177822 A1* | 7/2008 | Yoneda | H04L 12/282 |
| | | | 709/202 |
| 2009/0307197 A1 | 12/2009 | Senoo | |
| 2010/0138900 A1* | 6/2010 | Peterka | H04L 12/2812 |
| | | | 726/4 |
| 2011/0083069 A1* | 4/2011 | Paul | G06F 8/60 |
| | | | 715/234 |
| 2013/0057774 A1* | 3/2013 | Yoshida | H04M 1/72533 |
| | | | 348/725 |
| 2013/0086168 A1 | 4/2013 | Han et al. | |
| 2013/0103660 A1* | 4/2013 | Welsh | H04L 12/2812 |
| | | | 707/705 |
| 2013/0145048 A1 | 6/2013 | Lee et al. | |
| 2015/0052222 A1* | 2/2015 | Farrell | H04L 65/608 |
| | | | 709/217 |

FOREIGN PATENT DOCUMENTS

| | | |
|---|---|---|
| CN | 103561279 A | 2/2014 |
| CN | 103825890 A | 5/2014 |
| EP | 2692117 B1 | 6/2010 |
| WO | 2012109821 A1 | 9/2012 |

\* cited by examiner

MOBILE TERMINAL AND METHOD FOR ACHIEVING CLOUD STREAMING MEDIUM FILE SHARING BASED ON DLNA

RELATED APPLICATION

This application is a national phase entry under 35 USC 371 of International Patent Application No. PCT/CN2014/078803 filed on 29 May 2014, which claims priority from Chinese Patent Application No. 2014100567854 filed on 19 Feb. 2014, the disclosures of which are incorporated in their entirety by reference herein.

FIELD OF THE INVENTION

The present disclosure relates to the technical field of communications, and more particularly, to a method for achieving cloud streaming medium file sharing based on DLNA, and also relates to a mobile terminal.

BACKGROUND OF THE INVENTION

As an industrial specification for achieving medium exchange in digital home, Digital Living Network Alliance (DLNA) solves the problem of interconnection and inter-communication among personal computers (PCs), consumer electrical appliances, and mobile terminals through wireless networks and wired networks. Currently, most of applications of DLNA apparatuses and services are still limited to local area networks (LANs) such as home networks and office networks. With the DLNA technology, the existing mobile terminals are only able to share locally stored files with DLNA apparatuses. However, users often use the mobile terminals to access the Internet to play medium files including pictures, music and videos from the cloud. Because the medium files from the cloud are not saved in the mobile terminals, it is impossible to share the medium files from the cloud with the DLNA apparatuses via the mobile terminals.

SUMMARY OF THE INVENTION

The primary technical problem to be solved by the present disclosure is to provide a mobile terminal and a method for achieving cloud streaming medium file sharing based on DLNA, which can share a cloud streaming medium file with DLNA apparatuses via the mobile terminal.

To solve the aforesaid technical problem, a technical solution adopted in the present disclosure is as follows: a method for achieving cloud streaming medium file sharing based on DLNA is provided, and the method comprises the following steps of: when a DLNA sharing request is received from a user by a mobile terminal in the process of playing a cloud streaming medium file, acquiring from the cloud and caching a content clip of the streaming medium file by the mobile terminal according to the DLNA sharing request, wherein if the mobile terminal is disconnected from the cloud in the process of acquiring the content clip of the streaming medium file, it is determined whether the user chooses to keep a Uniform Resource Locator (URL) for accessing the streaming medium file; and if the user chooses to keep the URL, then the URL is acquired and stored so that the mobile terminal continues to acquire the content clip of the streaming medium file from the cloud according to the URL when the connection with the cloud is recovered; transcoding the cached content clip of the streaming medium file into a target format according to a preset transcoding parameter; searching for DLNA apparatuses in a local area network (LAN) where the mobile terminal is located according to a DLNA protocol; and transmitting the cached content clip of the streaming medium file to one of the DLNA apparatuses that is chosen by the user from the searching result, and controlling the DLNA apparatus to play the content clip of the streaming medium file.

In one embodiment, the DLNA apparatus chosen by the user has a plurality of players, and the step of controlling the DLNA apparatus to play the content clip of the streaming medium file comprises the following steps of: determining whether a player chosen by the user from the plurality of players supports playing of the streaming medium file; and if the chosen player supports playing of the streaming medium file, controlling the chosen player to play the content clip of the streaming medium file.

In one embodiment, if the chosen player does not support playing of the streaming medium file, then the user is prompted to re-choose a player or re-choose a DLNA apparatus.

To solve the aforesaid technical problem, another technical solution adopted in the present disclosure is as follows: a method for achieving cloud streaming medium file sharing based on DLNA is provided, and the method comprises the following steps of: when a DLNA sharing request is received from a user by a mobile terminal in the process of playing a cloud streaming medium file, acquiring from the cloud and caching a content clip of the streaming medium file by the mobile terminal according to the DLNA sharing request; searching for DLNA apparatuses in an LAN where the mobile terminal is located according to a DLNA protocol; and transmitting the cached content clip of the streaming medium file to one of the DLNA apparatuses that is chosen by the user from the searching result, and controlling the DLNA apparatus to play the content clip of the streaming medium file.

In one embodiment, the method further comprises the following step after the step of acquiring from the cloud and caching a content clip of the streaming medium file by the mobile terminal according to the DLNA sharing request and before the step of transmitting the cached content clip of the streaming medium file to one of the DLNA apparatuses that is chosen by the user from the searching result: transcoding the cached content clip of the streaming medium file into a target format according to a preset transcoding parameter.

In one embodiment, the step of acquiring from the cloud and caching a content clip of the streaming medium file by the mobile terminal according to the DLNA sharing request further comprises the following steps of: if the mobile terminal is disconnected from the cloud in the process of acquiring the content clip of the streaming medium file, determining whether the user chooses to keep a URL for accessing the streaming medium file; and if the user chooses to keep the URL, acquiring and storing the URL so that the mobile terminal continues to acquire the content clip of the streaming medium file from the cloud according to the URL when the connection with the cloud is recovered.

In one embodiment, the DLNA apparatus chosen by the user has a plurality of players, and the step of controlling the DLNA apparatus to play the content clip of the streaming medium file comprises the following steps of: determining whether a player chosen by the user from the plurality of players supports playing of the streaming medium file; and if the chosen player supports playing of the streaming medium file, controlling the chosen player to play the content clip of the streaming medium file.

In one embodiment, if the chosen player does not support playing of the streaming medium file, then the user is prompted to re-choose a player or re-choose a DLNA apparatus.

To solve the aforesaid technical problem, a further technical solution adopted in the present disclosure is as follows: a mobile terminal is provided, and the mobile terminal comprises: a medium acquiring module, being configured to, when a DLNA sharing request is received from a user by the mobile terminal in the process of playing a cloud streaming medium file, acquire from the cloud and cache a content clip of the streaming medium file according to the DLNA sharing request; a DLNA module, being configured to search for DLNA apparatuses in an LAN where the mobile terminal is located according to the DLNA protocol; and a medium sharing module, being configured to transmit the cached content clip of the streaming medium file to one of the DLNA apparatuses that is chosen by the user from the searching result, and control the DLNA apparatus to play the content clip of the streaming medium file.

In one embodiment, the mobile terminal further comprises a transcoding module, being configured to transcode the cached content clip of the streaming medium file into a target format according to a preset transcoding parameter after the content clip of the streaming medium file is cached by the medium acquiring module and before the cached content clip of the streaming medium file is transmitted by the medium sharing module to the DLNA apparatus that is chosen by the user from the searching result.

In one embodiment, the medium acquiring module comprises a file acquiring unit, a first determining unit and an address acquiring unit. The first determining unit is configured to, if the mobile terminal is disconnected from the cloud in the process of acquiring the content clip of the streaming medium file by the file acquiring unit, determine whether the user chooses to keep a URL for accessing the streaming medium file; and the address acquiring unit is configured to, if the user chooses to keep the URL, acquire and store the URL so that the file acquiring unit continues to acquire the content clip of the streaming medium file from the cloud according to the URL when the connection of the mobile terminal with the cloud is recovered.

In one embodiment, the DLNA apparatus chosen by the user has a plurality of players, and the medium sharing module comprises a transmitting unit, a second determining unit and a processing unit. The transmitting unit is configured to transmit the cached content clip of the streaming medium file to the DLNA apparatus that is chosen by the user from the searching result; the second determining unit is configured to determine whether a player chosen by the user from the plurality of players supports playing of the streaming medium file; and the processing unit is configured to, if the chosen player supports playing of the streaming medium file, control the chosen player to play the content clip of the streaming medium file.

In one embodiment, the processing unit is further configured to, if the chosen player does not support playing of the streaming medium file, prompt the user to re-choose a player or re-choose a DLNA apparatus.

According to the mobile terminal and the method for achieving cloud streaming medium file sharing based on DLNA of the present disclosure, the mobile terminal acquires and caches a content clip of the medium file according to the DLNA sharing request of the user in the process of playing a cloud streaming medium file so that the content clip of the streaming medium file can be stored in the mobile terminal; and the content clip of the streaming medium file can be transmitted to the DLNA apparatus in real time via the DLNA protocol, so the DLNA apparatus can play the content clip of the streaming medium file in real time. Because the streaming medium file can be played in real time simply by caching the content clip of the streaming medium file without completely downloading the streaming medium file and storing it into the mobile terminal, the cloud streaming medium file can be shared with the DLNA apparatus via the mobile terminal. This solves the technical problem of the prior art, extends the application of DLNA and enriches the user experience.

DETAILED DESCRIPTION OF THE INVENTION

Hereinbelow, the technical solutions of embodiments of the present disclosure will be described clearly and completely with reference to the attached drawings. Obviously, the embodiments described herein are only some of but not all of the embodiments of the present disclosure. All other embodiments that can be devised without making inventive efforts by those of ordinary skill in the art upon reviewing the embodiments of the present disclosure shall fall within the scope of the present disclosure.

Figure 1:
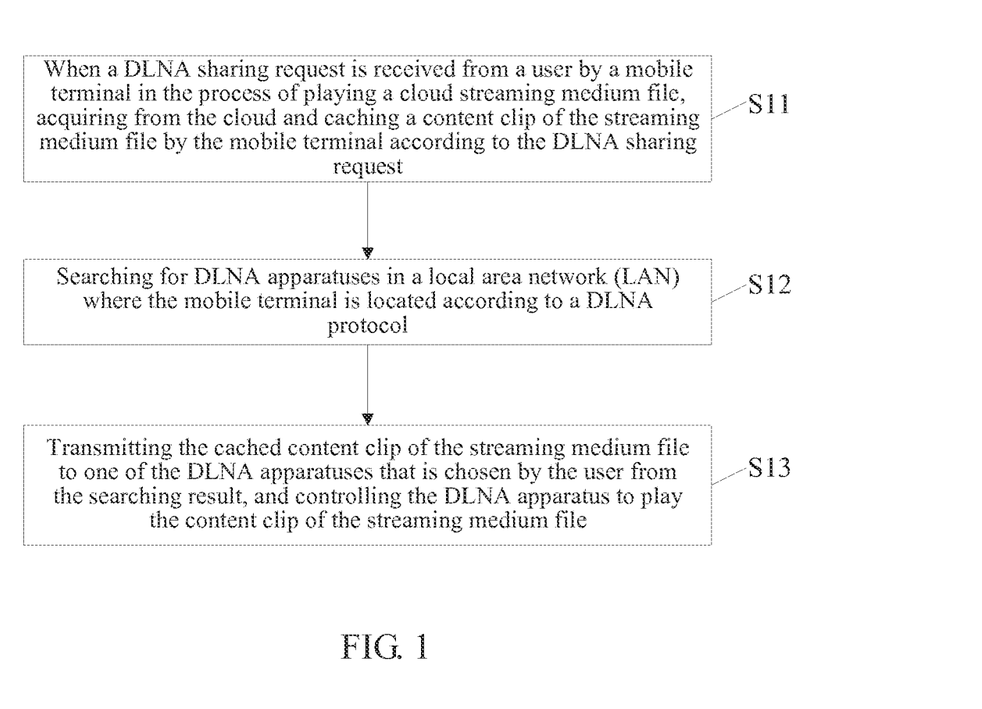
FIG. 1 is a schematic flowchart diagram of a method for achieving cloud streaming medium file sharing based on DLNA according to a first embodiment of the present disclosure.

Referring to FIG. 1, FIG. 1 is a schematic flowchart diagram of a method for achieving cloud streaming medium file sharing based on DLNA according to a first embodiment of the present disclosure. The method for achieving cloud streaming medium file sharing based on DLNA comprises the following steps:

S11: when a DLNA sharing request is received from a user by a mobile terminal in the process of playing a cloud streaming medium file, acquiring from the cloud and caching a content clip of the streaming medium file by the mobile terminal according to the DLNA sharing request.

Due to mobility of the mobile terminal, the storage space thereof is very limited and valuable. To save the storage space of the mobile terminal as much as possible, most of the users browse streaming medium files, e.g., resources such as pictures, music and videos, from the cloud by connecting the mobile terminal to the network without completely downloading the streaming medium files.

The mobile terminal may adopt a default algorithm to capture the content clip of the streaming medium file transmitted from the cloud to the mobile terminal. The captured content clip of the streaming medium file is cached into a fixed storage space.

In this embodiment, the mobile terminal may be an apparatus such as a mobile phone or a tablet computer.

S12: searching for DLNA apparatuses in a local area network (LAN) where the mobile terminal is located according to a DLNA protocol.

The DLAN apparatuses are apparatuses that adopt the DLNA protocol (e.g., computers or televisions), but may also be other mobile terminals. These DLAN apparatuses and the mobile terminal are located within a same LAN and can communicate with each other for example via Wireless Fidelity (WIFI) or a Wireless Local Area Network (WLAN).

S13: transmitting the cached content clip of the streaming medium file to one of the DLNA apparatuses that is chosen by the user from the searching result, and controlling the DLNA apparatus to play the content clip of the streaming medium file.

After one or more of the DLNA apparatuses that have been found are chosen by the user, the cached content clip of the streaming medium file is transmitted to the DLNA apparatus, and then the DLNA apparatus plays the content clip of the streaming medium file. In this way, the cloud streaming medium file is shared with the DLNA apparatus.

Optionally, the method may further comprise the following step after the step of acquiring from the cloud and caching a content clip of the streaming medium file by the mobile terminal according to the DLNA sharing request: transcoding the cached content clip of the streaming medium file into a target format according to a preset transcoding parameter. The format of the streaming medium file stored in the cloud may not be the format that is required by the user, so format transcoding is necessary. The transcoding parameter may be preset by the user or may be set by the mobile terminal through initialization according to its hardware standard.

According to the method for achieving cloud streaming medium file sharing based on DLNA of the embodiment of the present disclosure, the acquired content clip of the streaming medium file is transmitted by the mobile terminal to the available DLNA apparatus in real time and then played on the DLNA apparatus, and the streaming medium file can be played completely as long as the content clips thereof are acquired and played continuously. Because the cloud streaming medium file can be shared with the DLNA apparatus via the mobile terminal without being completely downloaded into the mobile terminal, the technical problem of the prior art is solved, the application of DLNA is extended and the user experience is enriched.

Figure 2:
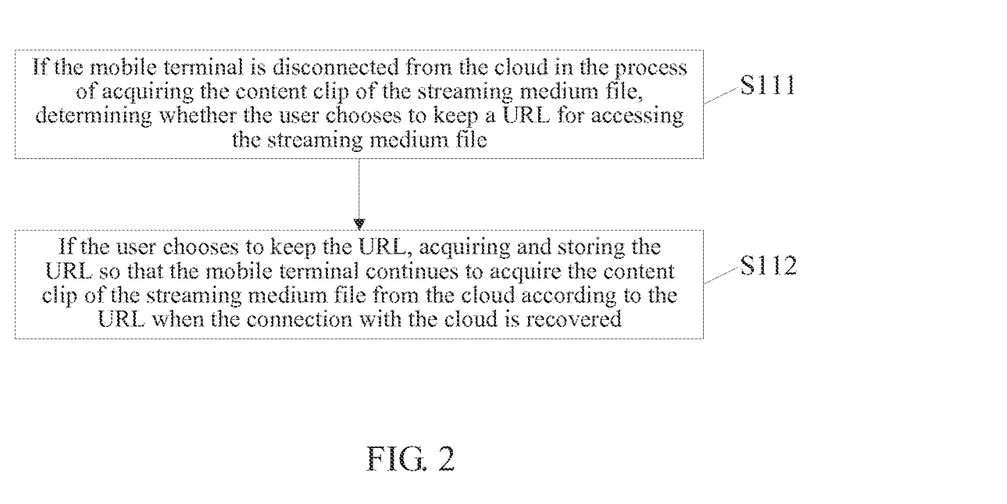
FIG. 2 is a schematic flowchart diagram of a method for achieving cloud streaming medium file sharing based on DLNA according to a second embodiment of the present disclosure.

Referring to FIG. 2, FIG. 2 is a schematic flowchart diagram of a method for achieving cloud streaming medium file sharing based on DLNA according to a second embodiment of the present disclosure. This embodiment at least comprises all the processes and steps of the first embodiment, and differs form the first embodiment in that the step of acquiring from the cloud and caching a content clip of the streaming medium file by the mobile terminal according to the DLNA sharing request further comprises the following steps:

S111: if the mobile terminal is disconnected from the cloud in the process of acquiring the content clip of the streaming medium file, determining whether the user chooses to keep a URL for accessing the streaming medium file.

What acquired by the mobile terminal is only a content clip of the streaming medium file, so in order to play the streaming medium file completely, content clips of the streaming medium file needs to be acquired continuously. During this process, if the mobile terminal is disconnected from the cloud due to a network anomaly, then the mobile terminal cannot acquire content clips of the streaming medium file. A Uniform Resource Locator (URL) is used as a network address of the streaming medium file, and the mobile terminal can be linked to the streaming medium file simply by accessing the Uniform Resource Locator (URL).

S112: if the user chooses to keep the URL, acquiring and storing the URL so that the mobile terminal continues to acquire the content clip of the streaming medium file from the cloud according to the URL when the connection with the cloud is recovered.

After the connection with the cloud is recovered, the mobile terminal may re-acquire the content clips of the streaming medium file from the cloud by accessing the streaming medium file according to the URL, or continue to acquire the remaining content clips of the streaming medium file from the cloud (i.e., intermittent transmission).

Figure 3:
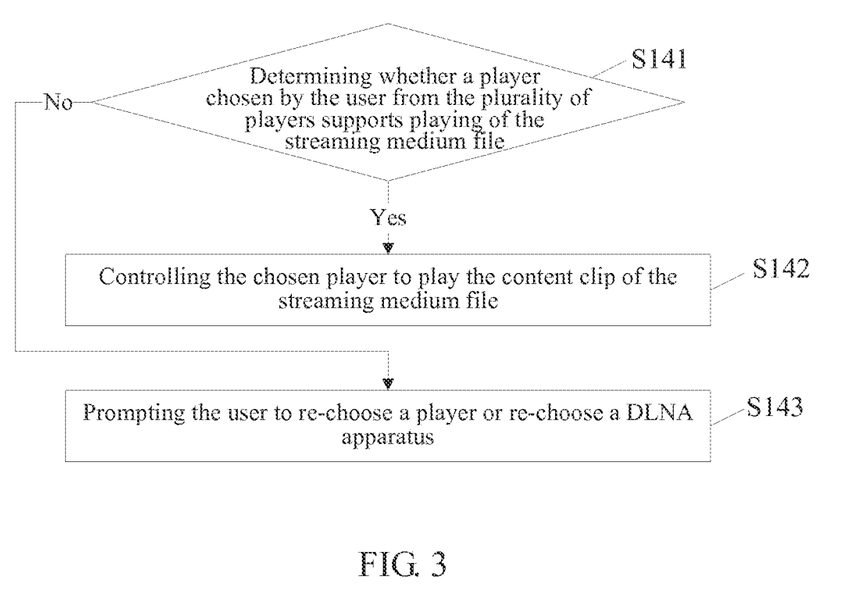
FIG. 3 is a schematic flowchart diagram of a method for achieving cloud streaming medium file sharing based on DLNA according to a third embodiment of the present disclosure.

Referring to FIG. 3, FIG. 3 is a schematic flowchart diagram of a method for achieving cloud streaming medium file sharing based on DLNA according to a third embodiment of the present disclosure. This embodiment at least comprises all the processes and steps of the first embodiment, and differs form the first embodiment in that: the DLNA apparatus chosen by the user has a plurality of players, and the step of controlling the DLNA apparatus to play the content clip of the streaming medium file comprises the following steps:

S141: determining whether a player chosen by the user from the plurality of players supports playing of the streaming medium file, where if the chosen player supports playing of the streaming medium file, then step S142 is executed; and if the chosen player does not support playing of the streaming medium file, then step S143 is executed.

If the format of the streaming medium file or the transcoded target format is not included in the supported formats of the player, then the player does not support playing of the streaming medium file. Alternatively, if the resolution of the streaming medium file is higher than the supported resolution of the player, then the player does not support playing of the streaming medium file either.

S142: controlling the chosen player to play the content clip of the streaming medium file.

If the player plays the content clips of the streaming medium file continuously, then the streaming medium file can be played completely.

S143: prompting the user to re-choose a player or re-choose a DLNA apparatus.

Figure 4:
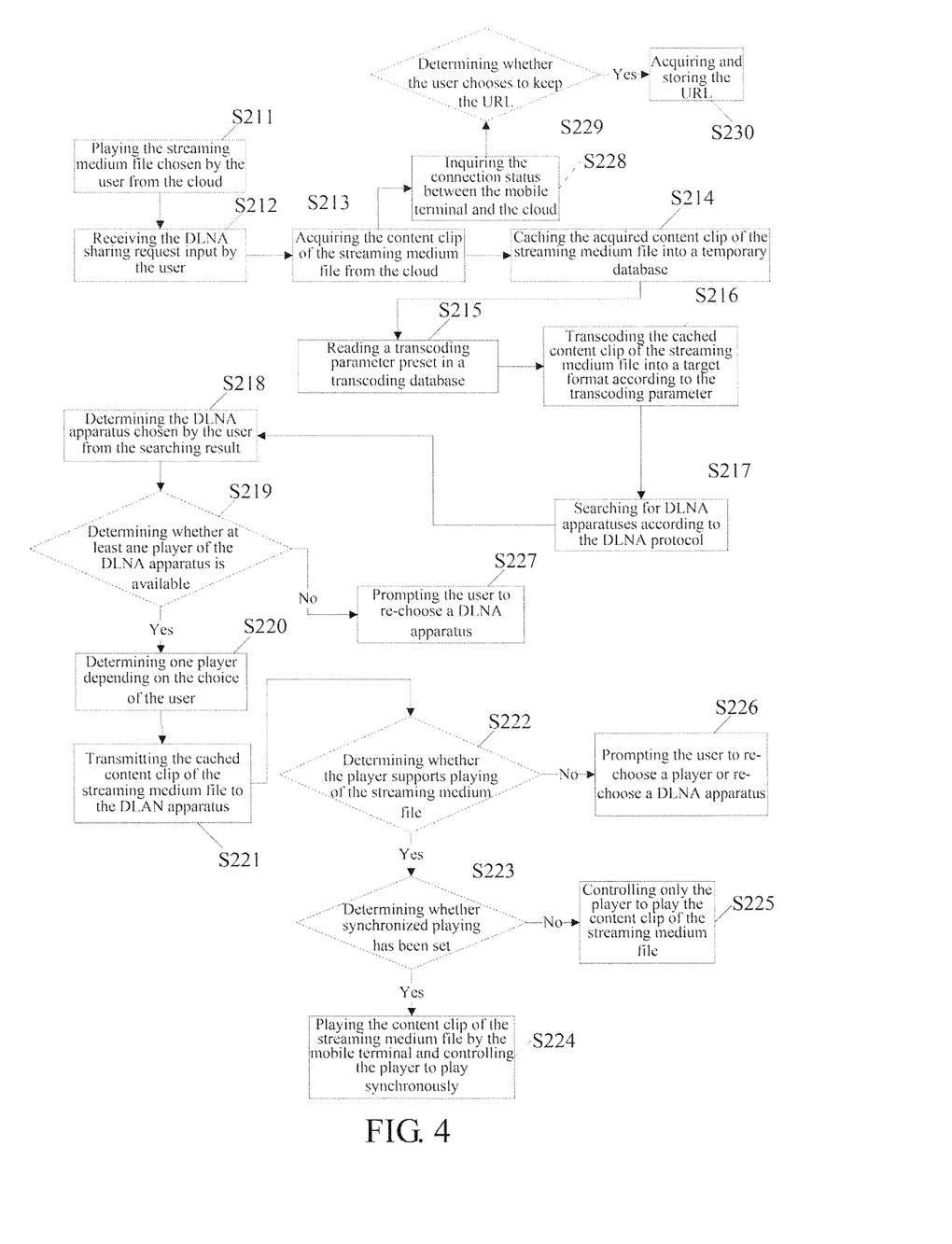
FIG. 4 is a schematic flowchart diagram of an application scenario of the method for achieving cloud streaming medium file sharing based on DLNA according to the present disclosure.

Referring to FIG. 4, FIG. 4 is a schematic flowchart diagram of an application scenario of the method for achieving cloud streaming medium file sharing based on DLNA according to the present disclosure, and comprises the following steps:

S211: playing the streaming medium file chosen by the user from the cloud.

The streaming medium file may be the content on a webpage browsed by the user, or may be the content on a social community application.

S212: receiving the DLNA sharing request input by the user.

The mobile terminal may be provided with a button on a playing display interface of the streaming medium file, and if the user clicks on the button, then a DLNA sharing request is sent by the user.

S213: acquiring the content clip of the streaming medium file from the cloud.

S214: caching the acquired content clip of the streaming medium file into a temporary database.

The temporary database may be a fixed storage area in the storage space of the mobile terminal.

S215: reading a transcoding parameter preset in a transcoding database.

The transcoding database may be another fixed storage area in the storage space of the mobile terminal.

S216: transcoding the cached content clip of the streaming medium file into a target format according to the transcoding parameter.

All the streaming medium files cached from the cloud have the target format after being transcoded.

S217: searching for DLNA apparatuses according to the DLNA protocol.

All the DLNA apparatuses and the mobile terminal are located in a same LAN and support a DLNA transmission protocol. If no DLNA apparatus is found by the mobile terminal, then the mobile terminal prompts the user that the file cannot be shared.

S218: determining the DLNA apparatus chosen by the user from the searching result.

The user chooses one or more DLNA apparatuses from the at least one DLAN apparatus that has been found. The DLNA apparatuses that have been found may be listed in the searching result.

S219: determining whether at least one player of the DLAN apparatus is available, where if the answer is "yes", then S220 is executed; and if the answer is "no", then S227 is executed.

S220: determining one player depending on the choice of the user.

S221: transmitting the cached content clip of the streaming medium file to the DLAN apparatus.

S222: determining whether the player supports playing of the streaming medium file, where if the answer is "yes", then S223 is executed; and if the answer is "no", then S226 is executed.

If the player supports the target format, then it is determined that the player supports the playing of the streaming medium file. Moreover, if there is more than one player which supports the target format, then the user needs to choose one player.

S223: determining whether synchronized playing has been set, where if the answer is "yes", then S224 is executed; and if the answer is "no", then S225 is executed.

S224: playing the content clip of the streaming medium file by the mobile terminal and controlling the player to play synchronously.

S225: controlling only the player to play the content clip of the streaming medium file.

In this case, the mobile terminal does not play the content clip of the streaming medium file, but it still continuously acquires and transmits the content clip of the streaming medium file to the DLAN apparatus in real time.

S226: prompting the user to re-choose a player or re-choose a DLNA apparatus.

The player does not support the playing of the streaming medium file, so the user needs to re-choose.

S227: prompting the user to re-choose a DLNA apparatus.

None of the players of the DLAN apparatus is available, so the user needs to re-choose.

S228: inquiring the connection status between the mobile terminal and the cloud.

S228 and S213 may be executed simultaneously, i.e., the connection status between the mobile terminal and the cloud may be inquired while the content clip of the streaming medium file is being acquired.

S229: determining whether the user chooses to keep the URL, where if the answer is "yes", then S230 is executed.

If the mobile terminal is disconnected from the cloud, then a dialog box may be popped up to allow the user to choose whether to keep the URL. If the user chooses to not keep the URL, then the process ends.

S230: acquiring and storing the URL.

Figure 5:
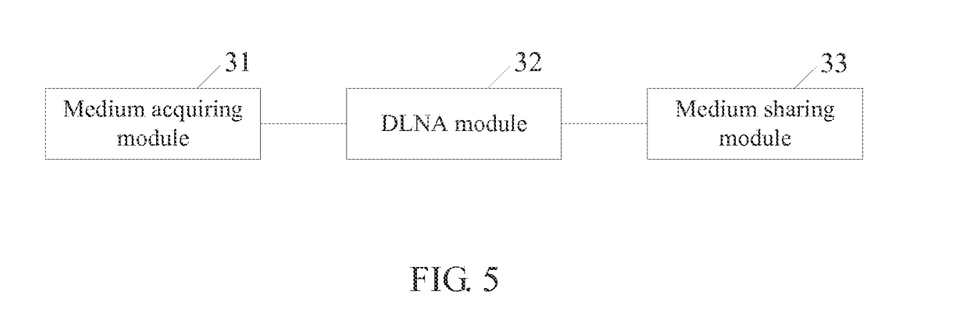
FIG. 5 is a schematic structural view of a mobile terminal according to an embodiment of the present disclosure.

Referring to FIG. 5, FIG. 5 is a schematic structural view of a mobile terminal according to an embodiment of the present disclosure. The mobile terminal comprises a medium acquiring module 31, a DLNA module 32 and a medium sharing module 33. The mobile terminal of this embodiment may be a mobile phone, a tablet computer, a personal digital assistant, etc.

The medium acquiring module 31 is configured to, when a DLNA sharing request is received from a user by the mobile terminal in the process of playing a cloud streaming medium file, acquire from the cloud and cache a content clip of the streaming medium file according to the DLNA sharing request. Due to mobility of the mobile terminal, the storage space thereof is very limited and valuable. To save the storage space of the mobile terminal as much as possible, most of the users browse streaming medium files, e.g., resources such as pictures, music and videos, from the cloud by connecting the mobile terminal to the network without completely downloading the streaming medium files. The mobile terminal may adopt a default algorithm to capture the content clip of the streaming medium file transmitted from the cloud to the mobile terminal. The captured content clip of the streaming medium file is cached into a fixed storage space.

The DLNA module 32 is configured to search for DLNA apparatuses in an LAN where the mobile terminal is located according to the DLNA protocol. The DLNA apparatuses are apparatuses that adopt the DLNA protocol (e.g., computers or televisions), but may also be other mobile terminals. These DLNA apparatuses and the mobile terminal are located within a same LAN and can communicate with each other for example via WIFI or WLAN.

The medium sharing module 33 is configured to transmit the cached content clip of the streaming medium file to one of the DLNA apparatuses that is chosen by the user from the searching result, and control the DLNA apparatus to play the content clip of the streaming medium file. After one or more of the DLNA apparatuses that have been found are chosen by the user, the cached content clip of the streaming medium file is transmitted to the DLNA apparatus, and then the DLNA apparatus plays the content clip of the streaming medium file. In this way, the cloud streaming medium file is shared with the DLNA apparatus.

The acquired content clip of the streaming medium file is transmitted by the mobile terminal of the embodiment of the present disclosure to the available DLNA apparatus in real time and then played on the DLNA apparatus, and the streaming medium file can be played completely as long as the content clips thereof are acquired and played continuously. Because the cloud streaming medium file can be shared with the DLNA apparatus via the mobile terminal without being completely downloaded into the mobile terminal, the technical problem of the prior art is solved, the application of DLNA is extended and the user experience is enriched.

Figure 6:
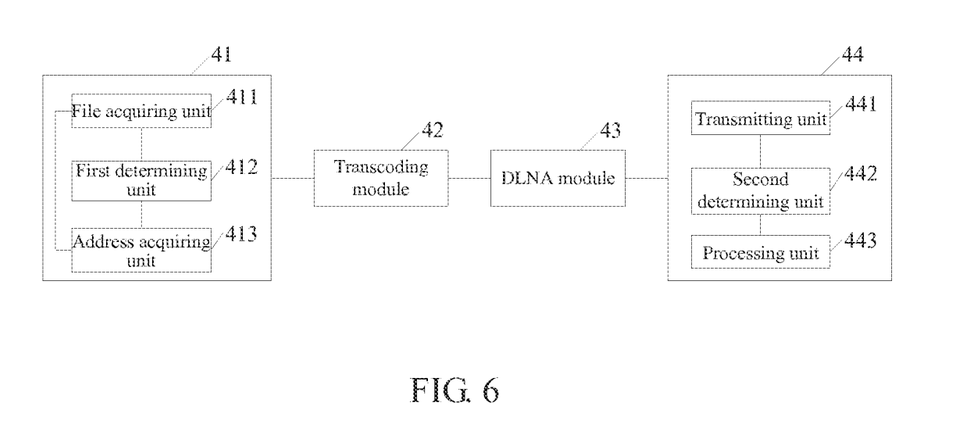
FIG. 6 is a schematic structural view of a mobile terminal according to another embodiment of the present disclosure.

Referring to FIG. 6, FIG. 6 is a schematic structural view of a mobile terminal according to another embodiment of the present disclosure. The mobile terminal comprises a medium acquiring module 41, a transcoding module 42, a DLNA module 43 and a medium sharing module 44. The medium acquiring module 41, the DLNA module 43 and the medium sharing module 44 at least have technical features that are the same as those of the medium acquiring module 31, the DLNA module 32 and the medium sharing module 33 of the aforesaid embodiment, and this embodiment differs from the aforesaid embodiment in that:

The transcoding module 42 is configured to transcode the cached content clip of the streaming medium file into a target format according to a preset transcoding parameter after the content clip of the streaming medium file is cached by the medium acquiring module and before the cached content clip of the streaming medium file is transmitted by the medium sharing module 44 to the DLNA apparatus that is chosen by the user from the searching result. The format of the streaming medium file stored in the cloud may not be the format that is required by the user, so format transcoding is necessary. The transcoding parameter may be preset by the user or may be set by the mobile terminal through initialization according to its hardware standard.

The medium acquiring module 41 comprises a file acquiring unit 411, a first determining unit 412 and an address acquiring unit 413.

The file acquiring unit 411 is configured to acquire the content clip of the streaming medium file.

The first determining unit 412 is configured to, if the mobile terminal is disconnected from the cloud in the process of acquiring the content clip of the streaming medium file by the file acquiring unit 411, determine whether the user chooses to keep a URL for accessing the streaming medium file. What acquired by the file acquiring unit 411 is only a content clip of the streaming medium file, so in order to play the streaming medium file completely, content clips of the streaming medium file needs to be acquired continuously. During this process, if the mobile terminal is disconnected from the cloud due to a network anomaly, then the file acquiring unit 411 cannot acquire the content clip of the streaming medium file. A URL is used as a network address of the streaming medium file, and the mobile terminal can be linked to the streaming medium file simply by accessing the URL.

The address acquiring unit 413 is configured to, if the user chooses to keep the URL, acquire and store the URL so that the file acquiring unit 411 continues to acquire the content clip of the streaming medium file from the cloud according to the URL when the connection of the mobile terminal with the cloud is recovered. After the connection of the mobile terminal with the cloud is recovered, the file acquiring unit 411 may re-acquire the content clips of the streaming medium file from the cloud by accessing the streaming medium file according to the URL, or continue to acquire the remaining content clips of the streaming medium file from the cloud (i.e., intermittent transmission).

The DLNA apparatus chosen by the user has a plurality of players, and the medium sharing module 44 comprises a transmitting unit 441, a second determining unit 442 and a processing unit 443.

The transmitting unit 441 is configured to transmit the cached content clip of the streaming medium file to the DLNA apparatus that is chosen by the user from the searching result.

The second determining unit 442 is configured to determine whether a player chosen by the user from the plurality of players supports playing of the streaming medium file. If the format of the streaming medium file or the transcoded target format is not included in the supported formats of the player, then the player does not support playing of the streaming medium file. Alternatively, if the resolution of the streaming medium file is higher than the supported resolution of the player, then the player does not support playing of the streaming medium file either.

The processing unit 443 is configured to, if the chosen player supports playing of the streaming medium file, control the chosen player to play the content clip of the streaming medium file. Optionally, the processing unit 443 is further configured to, if the chosen player does not support playing of the streaming medium file, prompt the user to re-choose a player or re-choose a DLNA apparatus. If the player plays the content clips of the streaming medium file continuously, then the streaming medium file can be played completely.

Furthermore, it is apparent to those skilled in the art, the present disclosure also provides a mobile terminal, which comprises a non-transitory program storage medium and a processor. The non-transitory program storage medium stores a program executed by the processor to perform the method as described in above. Furthermore, it is apparent to those skilled in the art that, the medium acquiring module 31, 41, the DLNA modules 32, 43 and the medium sharing module 33, 44, and the transcoding module 42 as shown in FIGS. 5-6 are software modules or software units. In another aspect, it is well-known that various software modules or software units inherently are stored in the non-transitory program storage medium and executed by the processor.

The mobile terminal and the method for achieving cloud streaming medium file sharing based on DLNA of the present disclosure overcame the restriction that the mobile terminal is only able to share the locally stored medium file with the DLNA apparatus, and the cloud streaming medium file can be shared with the DLNA apparatus while being played on the mobile terminal so that playing on the mobile terminal and sharing are performed synchronously. In this way, the cloud streaming medium file can be shared with the DLNA apparatus via the mobile terminal, and this solves the technical problem of the prior art, extends the application of DLNA and enriches the user experience.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for achieving cloud streaming medium file sharing based on Digital Living Network Alliance (DLNA), comprising:

receiving a DLNA sharing request from a user directly by a mobile terminal in the process of playing a cloud streaming medium file, acquiring from the cloud and caching a content clip of the streaming medium file by the mobile terminal according to the DLNA sharing request without completely downloading the medium file and meanwhile inquiring a connection status between the mobile terminal and the cloud, determining whether the user chooses to keep a Uniform Resource Locator (URL) for accessing the streaming medium file when the mobile terminal is disconnected from the cloud in the process of acquiring the content clip of the streaming medium file; and acquiring and storing the URL when the user chooses to keep the URL so that the mobile terminal continues to acquire the content clip of the streaming medium file from the cloud according to the URL when the connection with the cloud is recovered;

reading, by the mobile terminal, a preset transcoding parameter in a transcoding database, and transcoding the cached content clip of the streaming medium file into a target format according to the preset transcoding parameter;

searching, by the mobile terminal, for DLNA apparatuses in a local area network (LAN) where the mobile terminal is located according to a DLNA protocol;

transmitting, by the mobile terminal, the cached content clip of the streaming medium file to one or more of the DLNA apparatuses that is chosen by the user from the searching result in real time;

determining, by the mobile terminal, whether synchronized playing has been set; and controlling, by the mobile terminal, when the synchronized playing has been set, the one or more DLNA apparatus and the mobile terminal to play the content clip of the streaming medium file synchronously.

2. The method of claim 1, wherein the one or more DLNA apparatus chosen by the user has a plurality of players, and the controlling the one or more DLNA apparatus to play the content clip of the streaming medium file comprises:

determining whether a player chosen by the user from the plurality of players supports the cached content clip of the streaming medium file in the target format; and when the chosen player supports the cached content clip of the streaming medium file in the target format, controlling the chosen player to play the content clip of the streaming medium file.

3. The method of claim 2, wherein when the chosen player does not support the cached content clip of the streaming medium file in the target format, then the user is prompted to re-choose a player or re-choose a DLNA apparatus.

4. The method of claim 3, wherein the acquiring from the cloud and caching a content clip of the streaming medium file by the mobile terminal according to the DLNA sharing request without completely downloading the medium file further comprises:

capturing the content clip of the streaming medium file transmitted from the cloud by adopting a default algorithm, and caching the captured content clip of the streaming medium file into a fixed storage space.

5. The method of claim 4, wherein in the receiving a DLNA sharing request from a user directly by a mobile terminal in the process of playing a cloud streaming medium file, a button is displayed on a playing display interface of the streaming medium file, and the DLNA sharing request is received when the user clicks on the button.

6. The method of claim 1, further comprising controlling the one or more DLNA apparatus that is chosen from the searching result to play the content clip of the streaming medium file.

7. The method of claim 1, wherein the streaming medium file comprising pictures or music or videos.

8. The method of claim 1, wherein mobile terminal is a mobile phone or a tablet computer.

9. A mobile terminal, comprising:
a processor; and
a non-transitory program storage medium configured to:

receive a DLNA sharing request from a user directly by a mobile terminal in the process of playing a cloud streaming medium file;

acquire from the cloud and cache a content clip of the streaming medium file according to the DLNA sharing request without completely downloading the medium file and meanwhile inquire a connection status between the mobile terminal and the cloud, determine whether the user chooses to keep a Uniform Resource Locator (URL) for accessing the streaming medium file when the mobile terminal is disconnected from the cloud in the process of acquiring the content clip of the streaming medium file, and acquire and store the URL when the user chooses to keep the URL so that the mobile terminal continues to acquire the content clip of the streaming medium file from the cloud according to the URL when the connection with the cloud is recovered;

read a transcoding parameter preset in a transcoding database, and transcode the cached content clip of the streaming medium file into a target format according to the transcoding parameter;

search for DLNA apparatuses in an LAN where the mobile terminal is located according to the DLNA protocol;

transmit the cached content clip of the streaming medium file to one or more of the DLNA apparatuses that is chosen from the searching result in real time;

determine whether synchronized playing has been set; and when the synchronized playing has been set, control the one or more DLNA apparatus and the mobile terminal to play the content clip of the streaming medium file synchronously.

10. The mobile terminal of claim 9, wherein the non-transitory program storage medium is further configured to control the one or more DLNA apparatus that is chosen from the searching result to play the content clip of the streaming medium file.

11. The mobile terminal of claim 10, wherein the one or more DLNA apparatus chosen by the user has a plurality of players, and the non-transitory program storage medium is further configured to determine whether a player chosen by the user from the plurality of players supports the cached content clip of the streaming medium file in the target format; and control the chosen player to play the cached content clip of the streaming medium file when the chosen player supports the cached content clip of the streaming medium file in the target format.

12. The mobile terminal of claim 11, wherein the non-transitory program storage medium is further configured to prompt the user to re-choose a player or re-choose a DLNA apparatus when the chosen player does not support the cached content clip of the streaming medium file in the target format.

13. The mobile terminal of claim 12, wherein the non-transitory program storage medium is further configured to capture the content clip of the streaming medium file transmitted from the cloud by adopting a default algorithm, and cache the captured content clip of the streaming medium file into a fixed storage space.

14. The mobile terminal of claim 13, wherein the non-transitory program storage medium is further configured to display a button on a display interface of the streaming medium file; the DLNA sharing request is received when the user clicks on the button.

15. The mobile terminal of claim 9, wherein the streaming medium file comprising pictures or music or videos, the mobile terminal is a mobile phone or a tablet computer.

\* \* \* \* \*